US005912528A

United States Patent [19]

Kumada

[11] Patent Number: 5,912,528

[45] **Date of Patent: *Jun. 15, 1999**

[54] VIBRATING GYROSCOPE

[75] Inventor: Akira Kumada, Ohtsu, Japan

[73] Assignee: Murata Manufacturing Co., Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/626,384

[22] Filed: Apr. 2, 1996

[30] Foreign Application Priority Data

Apr. 3, 1995 [JP] Japan .................................... 7-103003

[51] Int. Cl.$^{6}$ .............................. G01P 9/04; H01L 41/08

[52] U.S. Cl. .......................... 310/353; 310/367; 310/316; 310/318; 310/319

[58] Field of Search .................................... 310/319, 321, 310/353, 316, 318, 367

[56] References Cited

U.S. PATENT DOCUMENTS

| | | | |
|---|---|---|---|
| 2,271,200 | 1/1942 | Mason | 310/367 |
| 2,412,438 | 12/1946 | Bach | 171/327 |
| 2,438,708 | 3/1948 | Kuenstler | 171/327 |
| 3,520,195 | 7/1970 | Tehon | 310/316 |
| 4,431,935 | 2/1984 | Rider | 310/331 |
| 4,799,385 | 1/1989 | Hulsing et al. | 73/505 |
| 5,012,174 | 4/1991 | Adkins et al. | 318/649 |
| 5,117,148 | 5/1992 | Nakamura et al. | 310/367 |
| 5,226,321 | 7/1993 | Varnham et al. | 73/505 |
| 5,270,607 | 12/1993 | Terajima | 310/316 |
| 5,349,857 | 9/1994 | Kasanami et al. | 73/505 |
| 5,355,034 | 10/1994 | Nakamura et al. | 307/491 |
| 5,375,336 | 12/1994 | Nakamura | 33/324 |
| 5,400,269 | 3/1995 | White et al. | 364/520 |
| 5,412,204 | 5/1995 | Nakamura | 310/316 |
| 5,415,039 | 5/1995 | Nakamura et al. | 73/517 AV |
| 5,430,342 | 7/1995 | Watson | 310/316 |
| 5,434,467 | 7/1995 | Abe et al. | 310/366 |
| 5,476,007 | 12/1995 | Nakamura | 73/504.12 |
| 5,505,085 | 4/1996 | Kasanami et al. | 310/316 |
| 5,520,050 | 5/1996 | Nakamura | 310/316 |

FOREIGN PATENT DOCUMENTS

| | | | |
|---|---|---|---|
| 0520467A3 | 6/1992 | European Pat. Off. | G01C 19/56 |
| 0520468A2 | 6/1992 | European Pat. Off. | G01C 19/56 |
| 0579974 | 6/1993 | European Pat. Off. | G01C 19/56 |
| 0 579 974 | 1/1994 | European Pat. Off. | G01C 19/56 |
| 0 597 338 | 5/1994 | European Pat. Off. | G01C 19/56 |
| 597338 | 5/1994 | European Pat. Off. | G01C 19/56 |
| 618266 | 1/1994 | Japan | G01C 19/56 |
| 650761 | 2/1994 | Japan | G01C 19/56 |
| 6147899 | 5/1994 | Japan | G01C 19/56 |

OTHER PUBLICATIONS

*Patent Abstracts Of Japan*, vol. 095, No. 007, Aug. 31, 1995 & JP 07 106660 A, Apr. 21, 1995.

*Primary Examiner*—Thomas M. Dougherty
*Attorney, Agent, or Firm*—Ostrolenk, Faber, Gerb & Soffen, LLP

[57] ABSTRACT

A vibrating gyroscope includes a ring-shaped vibrator having a node. A driver element is provided to cause the vibrator to vibrate flexurally. A detector element is formed along an axis of the vibrator and has a surface disposed such that the surface is non-perpendicular to a direction of vibration of said vibrator while the vibrator remains stationary. In one embodiment, the vibrator is metallic and the driver and detector are piezoelectric elements. In another embodiment, the vibrator is piezoelectric and the driver and detector are metal electrodes.

17 Claims, 4 Drawing Sheets

10 C A 66 70 62 12 70 68 64 B D

OUTPUT SIGNAL
42
DC AMPLIFIER
40
SMOOTHING CIRCUIT
38
SYNCHRONOUS DETECTION CIRCUIT
36
DIFFERENTIAL AMPLIFIER
20
18
22
14
10
24
34
PHASE CORRECTION CIRCUIT
32
OSCILLATION CIRCUIT

VIBRATING GYROSCOPE

BACKGROUND OF THE INVENTION

1. Field of the invention

The present invention relates generally to vibrating gyroscopes and more particularly to a vibrating gyroscope applicable to navigation systems for suitably directing the movement of an object so that it will reach its intended destination by detecting its current position based on detection of the angular velocity thereof.

Description of the Related Art

A vibrating gyroscope in the prior art is shown in FIGS. 4A and 4B, wherein FIG. 4A illustrates a perspective view of the gyroscope, and FIG. 4B depicts a cross-section thereof along a line IVB—IVB of FIG. 4A. The prior art gyroscope 1 generally includes a vibrator 2. The vibrator 2 contains a vibrating reed type elongate vibrating member 3 of a square rod shape. The vibrating member 3 has a pair of opposed side walls, on which piezoelectric elements 4*a* and 4*b* each acting as an electromechanical driver are mounted at intermediate or midway positions of the side walls, respectively. Each of these piezoelectric drivers 4*a*, 4*b* consists of a piezoelectric layer 5 sandwiched between upper and lower electrodes 6. The vibrating member 3 also has another pair of opposed surfaces on which further piezoelectric elements 4*c*, 4*d* are formed at midway positions of the surfaces to serve as detectors. Each of these piezoelectric detectors 4*c*, 4*d* has a three-layered structure similar to that of the piezoelectric drivers 4*a*, 4*b*, including an intermediate piezoelectric layer 5 sandwiched between inner and outer electrodes 7 on both surfaces of the layer 5.

As shown in FIG. 4A, in the vibrating gyroscope 1, two separate support members 8 support the vibrator 2 at specific positions near two node points (nodes) of the vibrating member 3. The support members 8 are arranged so as to maximally enable the vibrating member 3 to exhibit free vibrations. Each support member 8 may be a metal wire bent in an L-shaped form, which is secured by soldering to the vibrating member 3. In this case, the vibrating member 3 is provided with transverse through-holes (not shown) extending in the vicinity of the nodes. Such through-holes are so formed as to extend, in parallel with each other, from one side wall of the vibrating member 3 toward the opposite side wall thereof. The vibrating member 3 is supported by inserting and adhering one end of each L-shaped support member 8 to a corresponding one of the through-holes. More specifically, one end portion of each support member 8 extends perpendicularly to the axis of the vibrating member 3 to be fixed thereto, while the other end of it extends downward to be bonded by adhesion to a support base 9, which may be attached to a casing structure (not shown), thereby to provide an L-shaped leg-like support assembly as shown in FIG. 4A.

The prior art vibrating gyroscope 1 is provided with an oscillating circuit (not shown) connected between the piezoelectric drivers 4*a*, 4*b*. Upon the application of an oscillatory current from the oscillator circuit, the piezoelectric drivers 4*a*, 4*b* cause the vibrating member 3 to vibrate under a bending mode in a direction perpendicular to the planes of the piezoelectric drivers 4*a*, 4*b*. Under such a condition, when the vibrating gyroscope 1 is rotating or spinning about its axis, for example, the Coriolis force acts in the direction at right angles to the direction of vibration. Due to the action of this Coriolis force, the vibrating member 3 varies in its direction of vibration and generates an output voltage across the piezoelectric detectors 4*c*, 4*d*. Since the output voltage is proportional to the bending amount in the direction perpendicular to the formation planes of the piezoelectric detectors 4*c*, 4*d*, the angular rotation velocity or speed of the vibrating gyroscope 1 can be found by detecting such output voltage.

However, the prior art vibrating gyroscope 1 shown in FIGS. 4A and 4B suffers from the problem that the mechanical support structure for the vibrating member 3 is bulky and complicated in configuration due to the fact that (i) the vibrating member 3 consists of a vibrating reed of elongate square rod shape, which requires the nodes of free vibration to be positioned midway between both ends of the vibrating member 3, (ii) any distortion caused by Coriolis force while the vibrating member 3 is rotating about its axis is produced in the direction perpendicular to that of distortion resulting from free vibration of the vibrating member 3, and (iii) the sensitivity of the vibrating gyroscope 1 is enhanced by arranging the mechanical support structure for the vibrating member 3 such that the degree of freedom increases with respect to two such orthogonal directions.

More specifically, with the prior art vibrating gyroscope 1 of FIGS. 4A and 4B, since it is required that the through-holes be formed in the vibrating member 3 at specific positions near the midway nodes thereof, allowing the first ends of the respective L-shaped support members 8 to be inserted for adhesion while having the second ends thereof bonded to the support base 9, the resulting gyroscope structure becomes undesirably complicated while rendering the assembly process therefor difficult. In other words, the advantages provided by the vibrating gyroscope 1 of FIGS. 4A and 4B do not come without accompanying drawbacks: the gyroscope configuration is massive and complicated in its mechanical support structure for the vibrator 2, which results in the support members being bulky, causing miniaturization or down-sizing of such a vibrator to be difficult when light weight and small size is needed. Another problem faced with the prior art vibrating gyroscope 1 is that, since the vibrator 2 is supported by use of both the support members 8 and the support base 9, the resultant cost for materials and for the assembly of such an increased number of structural members remains high, which may also provide a serious bar to the accomplishment of decreased manufacturing cost.

SUMMARY OF THE INVENTION

It is therefore an object of the present invention to provide a new and improved vibrating gyroscope which is simple in structure, small in size, and low in manufacturing cost.

The object can be achieved by providing a specific vibrating gyroscope which includes a planar ring-shaped vibrator having a node. A driver element is provided for providing the vibrator with intended flexural vibrations, and a detector element is formed along the axis of the vibrator and has a surface disposed in such a way that the surface is not at right angles to the direction of vibration of the vibrator while the vibrator remains stationary, i.e. it is not rotating nor spinning.

Preferably, the vibrator is made from a permanent elastic metal material, whereas the driver and detector each are piezoelectric and, preferably, each comprises a piezoelectric material having opposing surfaces on each of which electrodes are disposed with the piezoelectric material being sandwiched therebetween.

In accordance with another aspect of the present invention, the vibrator is piezoelectric and the driver and detector are metallic.

In the vibrating gyroscopes of the invention, it may be preferable for the vibrator for each gyroscope to be formed in a planar rectangular closed-loop shape.

In accordance with the invention, employment of the specific vibrator formed to define the planar rectangular closed-loop ring-like shape may enable the nodes for free vibration thereof to be at specific positions near the corner edge portions diagonally opposed to each other at the both ends of the vibrator. More specifically, with such a vibrator, its nodes may come closer in position to the diagonal corner edge portions of the vibrator, as compared with conventional vibrating reed type vibrators. This means that the vibrator can be supported more effectively at positions near the diagonal corner edge portions thereof to support of the vibrator at or in the vicinity of its nodes.

When the vibrator is driven to vibrate or oscillate in a desired mode, it will exhibit flexural vibrations in the direction perpendicular to the plane in which the piezoelectric driver or the drive electrode is formed. When the gyroscope is rotating about the axis of the vibrator, the direction of vibration may vary due to the presence of Coriolis force, thus causing a voltage to appear at the piezoelectric detector or the detection electrode which is disposed such that it is prevented from being at right angles to the direction of vibration. Since this piezoelectric detector or detection electrode is arranged along the axial direction of the vibrator, the generation of such a voltage at each piezoelectric detector or each detection electrode depends upon the actual angular rotation velocity given with the axis thereof as the center of rotation center.

A significant advantage of this invention over the prior art is that forming of the vibrator in the planar rectangular closed-loop shape may result in its nodes being positioned near the diagonal corner edge portions of the vibrator, thereby simplifying as a whole the support structure for such vibrator at or in the vicinity of nodes. This means that the vibrating gyroscope can be rendered simpler in the support structure for vibrator compared to the prior art vibrating gyroscope shown in FIGS. 4A and 4B which has nodes located at midpoints of an elongate rod-shaped vibrator. Accordingly, the vibrating gyroscope of the invention can avoid the need to employ several support members attached them to the vibrator. A bulky and complicated support structure is no longer required to support the vibrator, thus enabling the resulting structure to be decreased in height, which may lead to the accomplishment of a vibrating gyroscope of simple structure, small size and low manufacturing cost.

These and other objects, features and advantages of the invention will be apparent from the following description of preferred embodiments, as illustrated in the accompanying drawings.

BRIEF DESCRIPTION OF THE DRAWINGS

FIGS. 1A and 1B illustrate a vibrator used in a vibrating gyroscope in accordance with one preferred embodiment of the present invention, wherein FIG. 1A shows a perspective view of the vibrator, and FIG. 1B is a cross-section of the same along line IB—IB of FIG. 1A.

FIGS. 2A and 2B show a vibrator used in a vibrating gyroscope in accordance with another embodiment of the invention, wherein FIG. 2A depicts a perspective view of the vibrator, and FIG. 2B shows a cross-section of the same along line IIB—IIB of FIG. 2A.

FIGS. 4A and 4B show an example of a prior art vibrating gyroscope, wherein FIG. 4A shows a perspective view of the device, and FIG. 4B is a cross-section thereof along line IVB—IVB in FIG. 4A.

DETAILED DESCRIPTION OF THE INVENTION

Figure 1A:
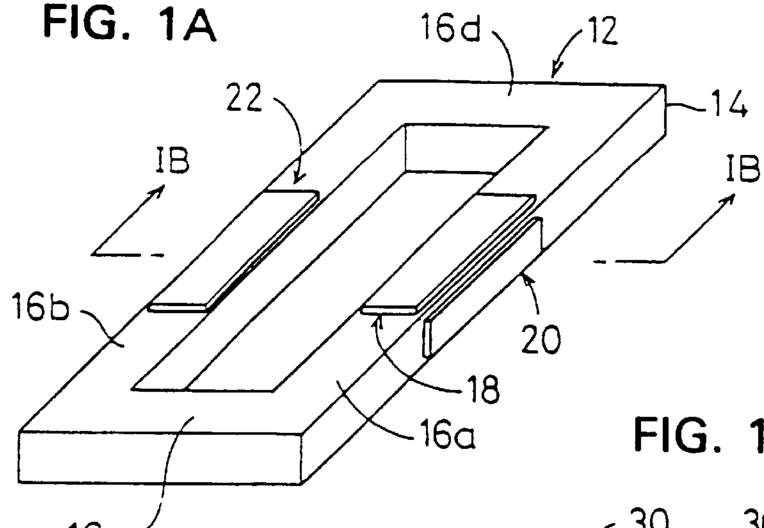
Figure 1B:
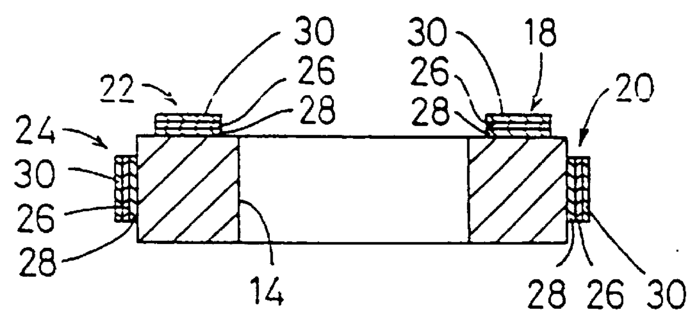
Figure 1C:
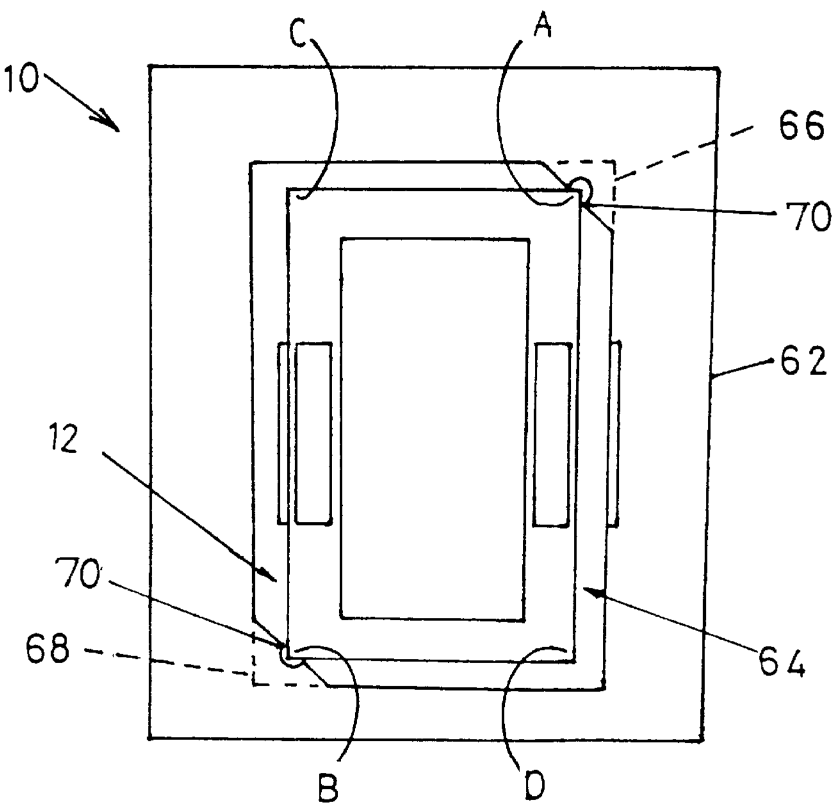
FIG. 1C is a plan view of a vibrating gyroscope having the vibrator shown in FIGS. 1A and 1B.

Referring to FIGS. 1A to 1C, a vibrating gyroscope 10 in accordance with one preferred embodiment of the invention includes a vibrator 12 and a board 62. The vibrator 12 includes a vibrating member 14 of a conductive material, such as a metal for example. In this embodiment, the vibrating member 14 is made from a permanent elastic metallic material, such as nickel alloy elinvar, or the like. Note that the vibrating member 14 may alternatively be made from either one of a variety of metals other than a permanent elastic metal or any other known materials which can easily expand and contract to exhibit good mechanical vibration characteristics, such as silicon, glass, crystal or the likes. The vibrating member 14 is formed to define a planar rectangular closed-loop or ring-like "frame" shape. The vibrating member 14 of FIG. 1A has a rectangular cross sectional profile at its respective side portions as apparent from the illustration of FIG. 1B. The vibrating member 14 consists of a pair of opposed side portions 16*a*, 16*b* and another pair of opposite side portions 16*c*, 16*d* greater in length than the sides 16*a*, 16*b*, all of which are integrally combined together in such a manner that the central axis of each side 16*a*, 16*b*, 16*c*, 16*d* is at right angles to that of a corresponding one of its adjacent sides associated therewith at one corner edge to define four interior right angles at four corner edges of the vibrating member 14.

The length of the sides 16*a* and 16*b* along the longitudinal direction thereof is preferably about the same wave length corresponding to a resonance frequency thereof. The length of the sides 16*c* and 16*d* along the longitudinal direction thereof is preferably almost half the length of the sides 16*a* and 16*b*, or about slightly less than a quarter of the wave length. However, the preferable lengths of the sides 16*a* to 16*d* also depends on a shape of cross sectional profile of the sides 16*a* to 16*d* and a shape of corners at which the sides 16*a* to 16*d* are connected. The precise lengths therefore should be adjusted so that the nodes of a vibration at the resonance frequency is located at peripheries of diagonal corners of the vibrating member 14.

As shown in FIG. 1A, one of the long sides of the vibrating member 14, i.e. side 16*a*, is provided with a piezoelectric element 18 acting as an electromechanical driver, which element is mounted on the top surface of side 16*a*. The side 16*a* is also provided with another piezoelectric element 20 functioning as a detector, which element is disposed on the outer side wall thereof. As will be explained in detail later, the piezoelectric element 20 is arranged on the side 16*a* such that the main plain of the piezoelectric element 20 is non-perpendicular to the direction along which the side 16*a* vibrates under a bending mode when the vibrating gyroscope 10 is not rotated. In FIG. 1A to 1C, the main plane of the piezoelectric element 20 is parallel to the direction of vibration. Similarly, the other of the long sides of the vibrating member 14, namely side 16*b* opposite side 16*a*, is provided with an electromechanical driver comprised of a piezoelectric element 22, and a piezoelectric detector element 24. The elements 22, 24 are respectively mounted on the top surface and the outer side wall of the side 16*b* as best illustrated in FIG. 1B Each of the piezoelectric elements 18, 20, 22, 24 employed in this embodiment as the electromechanical drivers 18, 22 and detectors 20, 24 has a three-layered structure, which consists of a piezoelectric layer 26 of a chosen piezoelectric ceramic, here lead zirconate titanate (PZT) ceramic, and a pair of inner and outer electrodes 28, 30 disposed on either surface of the PZT ceramic layer 26 with the intermediate PZT layer 26 sandwiched therebetween. The inner electrode 28 is bonded using an adhesive material, such as an epoxy adhesive, to the outer side wall surface of the rectangular ring-like vibrating member 14.

As shown in FIG. 1C, the gyroscope 10 also includes the board 62 having an opening 64 which leaves peripheral portions 66 and 68. Corner edge portions A and 3 of the vibrating member 14 adhere to the peripheral portions 66 and 68 through an adhesive material. Thus, the vibrator 12 is supported by the board 62 only at the corner edge portions A and B thereof. The opening 64 provides the vibrator 12 with a free space necessary for the vibrator 12 to vibrate under operation.

As is apparent to a person skilled in the art, the board 62 can be made from any kind of material as long as the board 62 can support the vibrator 12 firmly. Moreover, the opening 64 can have any kind of shape as long as the board 66 is in contact with only the peripheral portions 66 and 68. For example, the opening 64 shown in FIG. 1C is a rectangular shape having notches at diagonal corners thereof. In addition, the vibrator 12 can be supported by the board 62 at corner edge portions C and D by providing peripheral portions 66 and 68 at portions which correspond to the corner edge portions C and D.

It is also appreciated that the board 62 can support the vibrator 12 at more than two points Specifically, the vibrator 12 can be supported by the board 62 at the corner edge portions A, B, and C, or at the corner edge portions A, B, C, and D. As the number of the corner edge portions which support the vibrator 12 increases, the vibrator 12 is held by the board 12 more firmly. According to the preferred embodiments of the present inventions such a firm supporting structure is obtained without complicating the supporting structure and the manufacturing steps, compared with the conventional supporting structure shown in FIGS. 4A and 4B.

Figure 3:
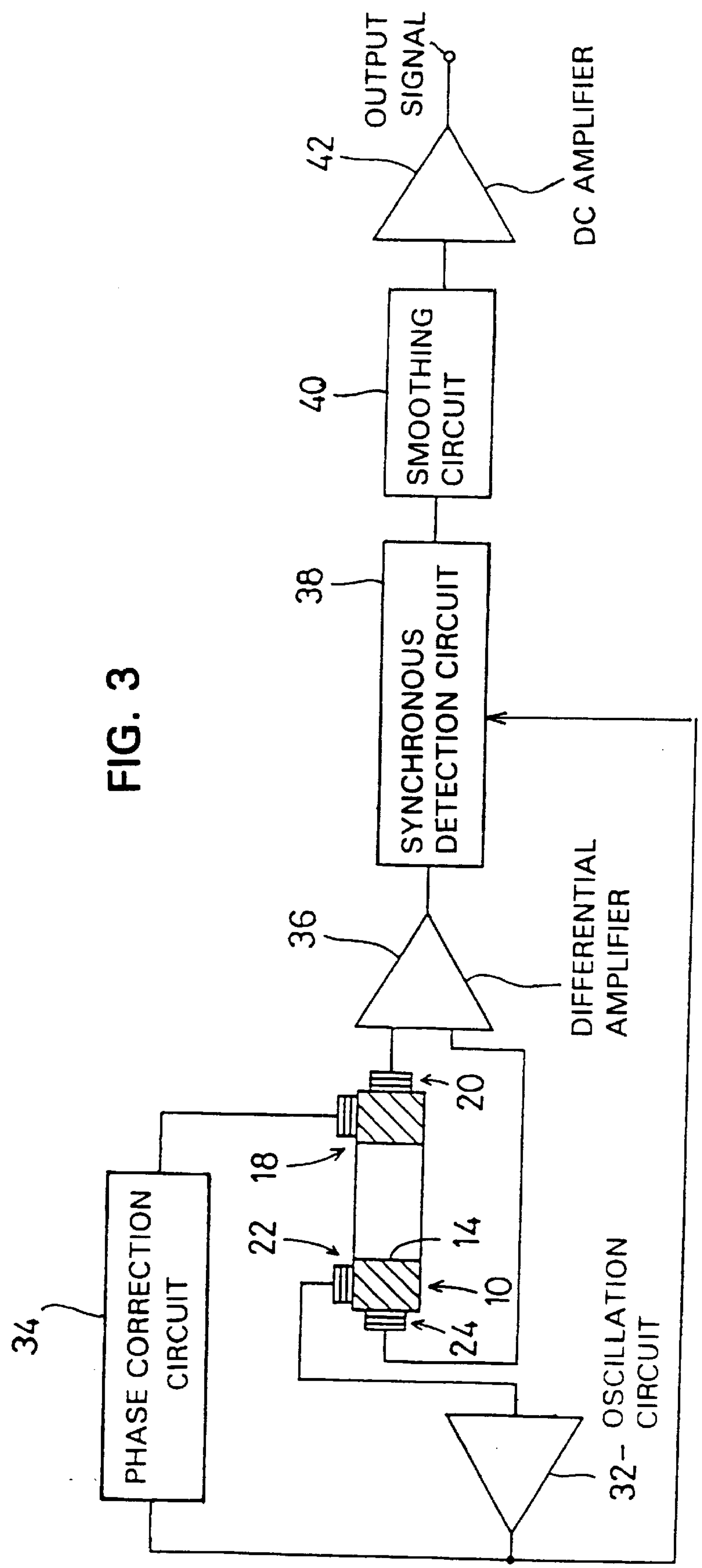
FIG. 3 is a circuit diagram showing the configuration of electrical circuitry associated with the vibrating gyroscope of the invention.

The vibrating gyroscope 10 can be used with associated electrical circuitry, which is configured as shown in FIG. 3. Such electrical circuitry can be provided on the board 62. The circuitry includes an oscillator circuit 32 connected to one piezoelectric driver 22 of the vibrator 12. The oscillator circuit 32 is also connected to the other piezoelectric driver 18 through a phase correction circuit 34. The oscillator circuit 32 generates an amplified oscillation signal, which is then fed to the piezoelectric driver 18 under the phase control of the phase correction circuit 34. The presence of the oscillator circuit 32 and phase correction circuit 34 assures that a stable drive signal is constantly supplied to the vibrating member 14 at the resonant frequency thereof.

As shown in FIG. 3, the piezoelectric detectors 20, 24 are respectively connected at their outer electrodes 30 of FIG. 13 to the inverting and non-inverting inputs of a differential amplifier circuit 36. The differential amplifier 36 generates a measurement voltage indicative of a difference between the output voltages of the piezoelectric detectors 20, 24, if any. The output of the differential amplifier 36 is connected to a synchronous detection circuit 38 at a first input thereof. The synchronous detection circuit 38 has a second input coupled to the oscillator circuit 32, enabling the output voltage of the differential amplifier 36 to be detected such that the detection is substantially synchronized with the oscillation frequency of the oscillator circuit 32. The synchronous detection circuit 38 produces at its output a detection signal, which is sent to a smoothing circuit 40, such as a low-pass filter (LPF), and is then filtered for waveform smoothing. The resultant detection signal is supplied to a direct current (DC) amplifier circuit 42 of the final stage, which amplifies it to a predetermined level, thus finally providing an output signal of the vibrating gyroscope 10.

The vibrating gyroscope 10 operates as follows. When the vibrating gyroscope 10 is at rest and remains stationary, namely, when it is not spinning the vibrator 12 will vibrate under a bending mode, i.e., periodically bend upward and downward to exhibit flexural vibrations in a specific direction perpendicular to the principal plane of the piezoelectric drivers 18, 22. In this case, as the bending amount of vibration is the same between the planes of the vibrating member 14 on which the piezoelectric detectors 20, 24 are mounted respectively. The output voltages of these piezoelectric detectors 20, 24 are kept at an equal potential to each other. This facilitates the mutual canceling of the output voltages of the piezoelectric detectors 20, 24 at the differential amplifier 36, causing the output voltage of the amplifier to remain substantially zero.

Then, assuming that the vibrating gyroscope 10 is rotating or spinning about its center axis, the Coriolis force may become effective in the direction that is at right angles to the direction of vibration of the vibrating member 14. The presence of this Coriolis force causes the vibrating member 14 to change its direction of vibration, resulting in an output voltage being derived from the respective piezoelectric detectors 20, 24. The output voltage is proportional to the bending amount of vibration in the orthogonal direction to the principal plane of each piezoelectric detector 20, 24. Therefore, it becomes possible by measurement of the output voltage to detect the actual angular rotation velocity or speed of the vibrating gyroscope 10. Note here that the same goes with another case where the vibrating gyroscope 10 is arranged to rotate about any given axis aligned with the central axis thereof.

As is apparent from the above-explanation, if the piezoelectric detectors 20 and 24 are arranged on the sides 16*a* and 16*b* such that the main plane of the piezoelectric detectors 20 and 24 is perpendicular to the direction along which the sides 16*a* and 16*b* vibrate under a bending mode, a vibration due to Coriolis force is not effectively detected by the piezoelectric detectors 20 and 24.

An advantage of the vibrating gyroscope 10 shown in FIGS. 1A and 1B is that the support structure required for the vibrator 12 is simple. This can be said for the following reason. With the vibrating gyroscope 10, the vibrating member 14 is specifically arranged such that its vibrating reed portion is formed in the planar rectangular closed-loop or ring-like shape, which may correspond to a combination of two tuning forks with their U-shaped cantilever arms being bonded together at corresponding free ends thereof. With such an arrangement, the nodes of the vibrating member 14 are present at certain positions near the diagonally opposed corner edge portions of the vibrating member 14. This enables the vibrator 12 to be effectively supported at positions corresponding to the diagonal corner edge portions or at positions close thereto, without requiring any additional support members 8 as used in the prior art vibrating gyroscope 1 disclosed in the introductory part of the description. Excluding such structural members leads to the achievement of a simple support structure for the vibrator 12.

Figure 4A:
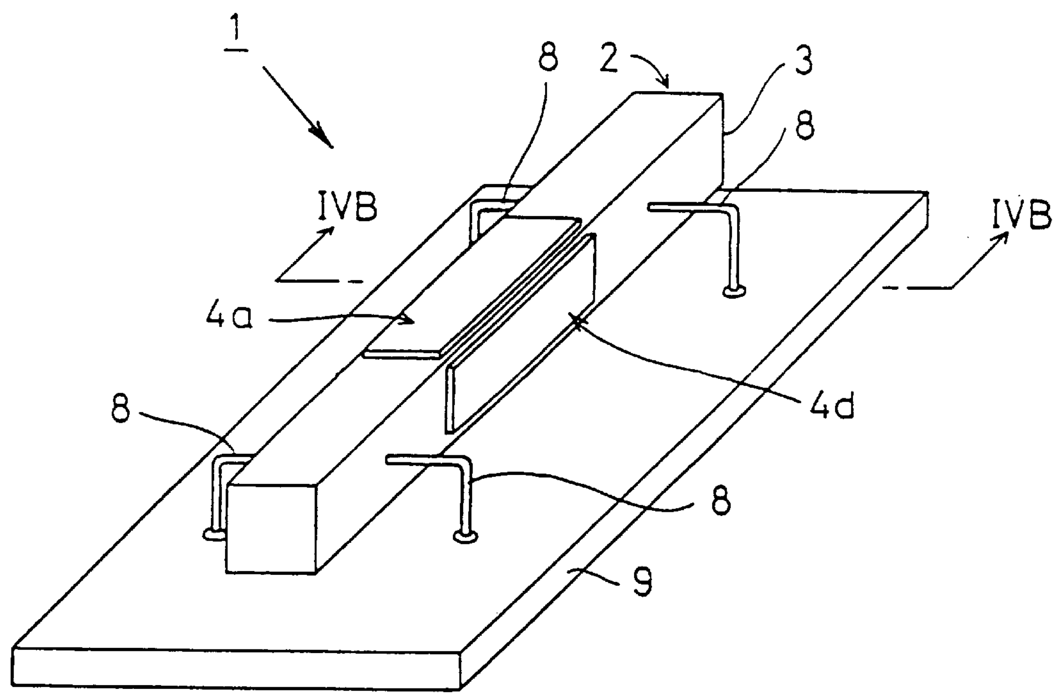
Figure 4B:
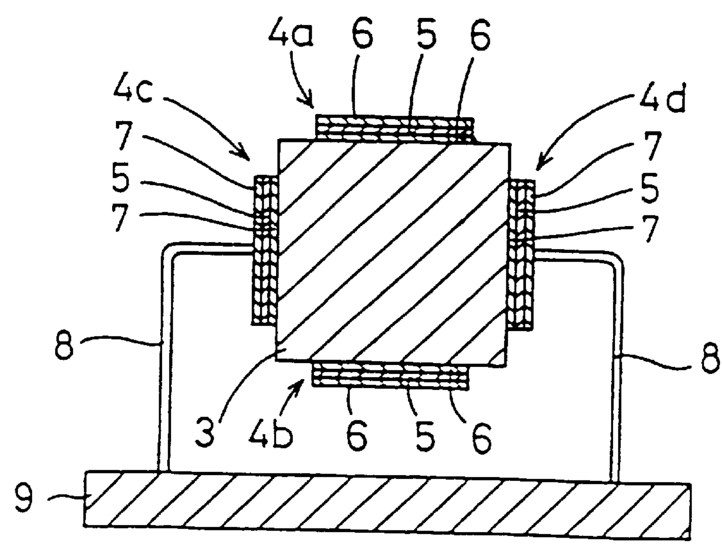

Another advantage of the vibrating gyroscope 10 of FIGS. 1A and 1B over the prior art gyroscope 1 shown in FIGS. 4A and 4B is that for the same resonant frequency, the vibrating member 14 can be decreased in length so that the shortened length is almost half the required length of the vibrating-reed body 3 of gyroscope 1.

More specifically, with the gyroscope 10, unlike the prior art, any undesirably bulky and complicated support structure, such as one including the support members 8 and the support base 9 as employed for the vibrating member 3 in the prior art gyroscope 1 of FIGS. 4A and 4B, is no longer required for the achievement of an effective vibrator support structure. Avoiding the need to employ such extra components contributes to reduction of the number of assembly parts.

The reduction in the number of assembly parts may also contribute to planarization of the vibrating gyroscope 10 as a whole. More specifically the gyroscope 10 can be decreased in height by a certain degree corresponding to the sum of the height of the support members 8 and the thickness of the support base 9, which have been used in the prior art gyroscope 1 and now excluded from the gyroscope 10 Furthermore, the manufacture of gyroscope 10 can also be simplified by excluding the need for a laborious assembly process for such support members and support base. This assures that the gyroscope 10 is simple in structure, small in size, and reduced in cost for the manufacture thereof.

It should be noted that, in the case of the gyroscope 10, the vibrating member 14 can be energized or excited for vibration by use of either one of the piezoelectric drivers 18, 22. The same goes with the piezoelectric detectors 20, 24; with either one of them, the angular rotation velocity can be detected. Furthermore, the vibrating gyroscope 10 may be arranged such that the short sides 16*c*, 16*d* of the vibrating member 14 are additionally provided with further piezoelectric drivers and detectors; in such a case also, the further piezoelectric drivers are mounted on the top surface of these sides, whereas the piezoelectric detectors are on the side walls thereof.

It should also be noted that the vibrating gyroscope 10 may alternatively be modified such that the piezoelectric drivers 18, 22 are mounted on the inner and outer side wall surfaces respectively. In this case, the piezoelectric detectors 20, 24 are amounted on the top and bottom surfaces of each of opposed sides 16*a*, 16*b* of the vibrating member 14. With the resultant vibrating gyroscope 10, the vibrator 12 will periodically bend inward and outward along the width of the vibrating member 14 to exhibit lateral flexural vibrations.

Figure 2A:
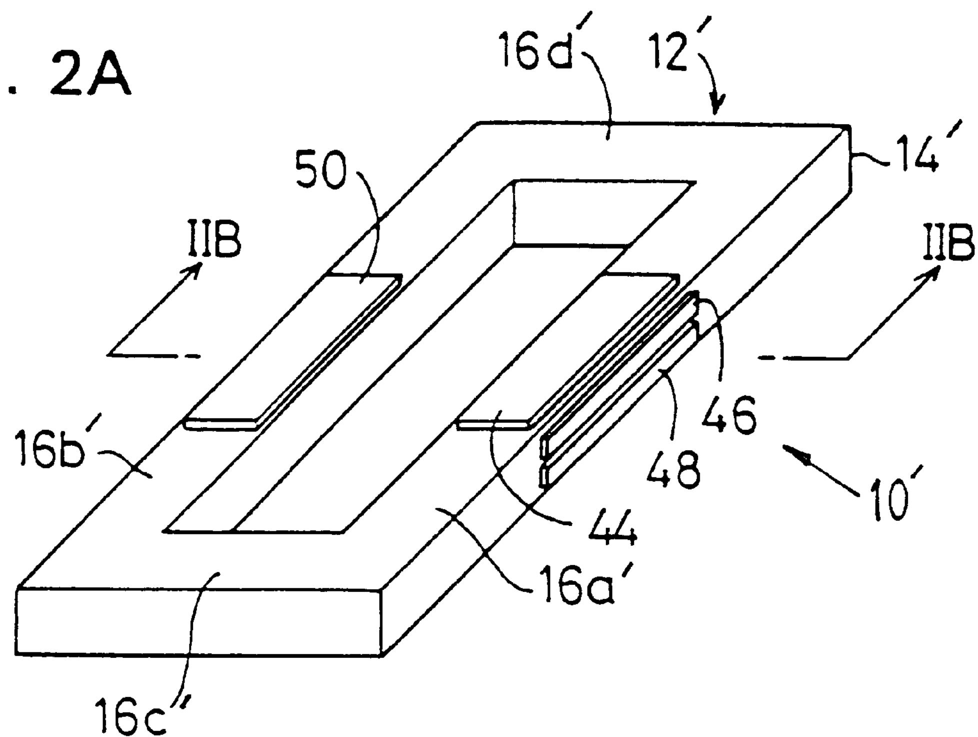
Figure 2B:
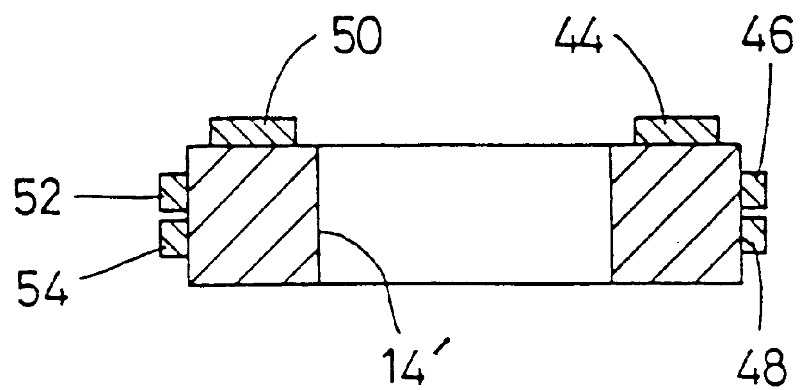

A vibrator 12' of a vibrating gyroscope 10 in accordance with another embodiment of the invention is shown in FIGS. 2A and 2B. Elements in this embodiment which have similar structure and function as elements in the previous embodiment have the same reference numeral primed. The difference of this gyroscope 10' from the previous embodiment is that the vibrating member 14' is comprised of a piezoelectric material and has several electrodes directly mounted on the surfaces thereof.

More specifically, the vibrating gyroscope 10' of FIGS. 2A and 2B includes a vibrator 12', which contains a planar rectangular closed-loop or ring-like vibrating member 14' of a piezoelectric material, such as a piezoelectric ceramic. The vibrating member 14' has on one side portion 16'*a* thereof a drive electrode 44, which is mounted on the top surface of the vibrating member 14'. Further, two parallel detection electrodes 46, 48 are formed on the side 16'*a* of the vibrating member 14' in such a way that these electrodes 46, 48 are spaced a part from each other on one outer side wall surface of the vibrating member 14'.

Similarly, on the opposite side 16'*b* of the vibrating member 14' is provided another drive electrode 50 and another pair of separated parallel detection electrodes 52, 54: the drive electrode 50 is mounted on the top surface of the vibrating member 14'; and the detection electrodes 52, 54 are mounted on the outer side wall surface of the vibrating member 14'. Each of these electrodes 50, 52, 54 is a conductive layer which may be directly formed by thick-film printing techniques on a corresponding surface of the vibrating member 14'.

The drive electrodes 44, 50 and detection electrodes 46, 48, 52, 54 may alternatively be formed by thin-film printing techniques. The vibrating gyroscope 10' may also be modified such that the detection electrode section consists of a single pair of electrodes 46, 48 formed on one side portion 16'*a* of the vibrating member 14'.

With such an arrangement also, the vibrating gyroscope 10' of FIGS. 2A and 2B can be made thinner than the prior art gyroscope 1 by excluding the use of the support members and the support base of the prior art, and at the same time manufacture thereof can be simplified due to the fact that the assembly process of such extra components is no longer required.

While the invention has been particularly shown and described with reference to preferred embodiments thereof, it will be understood by those skilled in the art that the foregoing and other changes in form and details may be made without departing from the spirit and scope of the invention. For example, in each embodiment, the cross-section of the planar ring-like vibrating member 14 (or 14') may be changed to a triangle, polyhedron, circle or other shape, rather than the rectangular or square one. Furthermore, the planar rectangular ring-like geometry of the vibrating member 14 (or 14') may also be modified into another shape, such as polygon or circle. Additionally, in the case where the vibrating member 14 (or 14') is in a planar circular shape, the vibrating member 14 (or 14') may be supported at certain positions near a pair of diametrically opposite points thereon.

What is claimed is:

1. A vibrating gyroscope, comprising:

a ring-shaped vibrator a planar oblong rectangular closed-loop shape, said ring-shaped vibrator having two corner edge portions on a diagonal line of said planar oblong rectangular closed-loop shape and nodes of a vibration at the vicinities of said two corner edge portions, respectively;

a driver element for causing said vibrator to vibrate flexurally;

a detector element formed along an axis of said vibrator and having a surface disposed such that the surface is non-perpendicular to a direction of vibration of said vibrator while said vibrator remains stationary; and a support engaging said two corner edge portions of said ring-shaped vibrator.

2. A vibrating gyroscope according to claim 1, wherein the vibrator is made of metallic material, the driver element is a piezoelectric element and the detector element is a piezoelectric element.

3. The vibrating gyroscope according to claim 2, wherein said vibrator is made from a permanent elastic metallic material, and wherein each of the piezoelectric elements includes a piezoelectric layer sandwiched between electrodes formed on opposite surfaces of said layer respectively.

4. A vibrating gyroscope according to claim 1, wherein said support is a board having an opening larger than said ring-shaped vibrator, said two diagonal corner edge portions of said ring-shaped vibrator being fixed to peripheries of said opening.

5. A vibrating gyroscope according to claim 1, wherein said ring-shaped vibrator has a pair of first sides and a pair of second sides which are longer than said first sides and connected to said first sides with a right angle, said first sides of said ring-shaped vibrator having a length of about a wavelength corresponding to a frequency of said vibration, said second sides of said ring-shaped vibrator having a length slightly less than a quarter wavelength corresponding to said frequency of said vibration.

6. The vibrating gyroscope according to claim 1, wherein the vibrator is made of a piezoelectric material, the drive element is a drive electrode and the detector element is a detector electrode.

7. The vibrating gyroscope according to claim 6, wherein said vibrator is made from a piezoelectric ceramic material.

8. The vibrating gyroscope according to claim 6, wherein said vibrator has a planar rectangular closed-loop shape.

9. The vibrating gyroscope according to claim 8, further comprising a support means for supporting said vibrator at a selected position near the node thereof.

10. A vibrating gyroscope, comprising:

a ring-shaped vibrator having a planar oblong rectangular closed-loop shape, said ring-shaped vibrator having two corner edge portions on a diagonal line of said planar oblong rectangular closed-loop shape and nodes of a vibration at the vicinities of said two corner edge portions, respectively;

first and second driver elements for causing said vibrator to vibrate flexurally;

a support engaging said two corner edge portions of said ring-shaped vibrator;

an oscillation circuit connected to one of the driver elements;

a phase correction circuit connected between the output of the oscillation circuit and the other of the driver elements;

first and second detector elements formed along an axis of said vibrator and having respective surfaces disposed such that the surfaces are non-perpendicular to a direction of vibration of said vibrator while said vibrator remains stationary;

a differential amplifier connected to the first and second detector elements;

a synchronous detection circuit connected to the output of the differential amplifier and to the output of the oscillation circuit;

a smoothing circuit connected to the output of the synchronous detection circuit; and a DC amplifier connected to the output of the smoothing circuit.

11. The vibrating gyroscope according to claim 10, wherein the vibrator is made of metallic material, the driver elements are piezoelectric elements and the detector elements are piezoelectric elements.

12. The vibrating gyroscope according to claim 11, wherein said vibrator is made from a permanent elastic metallic material, and wherein each of the piezoelectric elements includes a piezoelectric layer sandwiched between electrodes formed on opposite surfaces of said layer respectively.

13. A vibrating gyroscope according to claim 10, wherein said support is a board having an opening larger than said ring-shaped vibrator, said two diagonal corner edge portions of said ring-shaped vibrator being fixed to peripheries of said opening.

14. A vibrating gyroscope according to claim 10, wherein said ring-shaped vibrator has a pair of first sides and a pair of second sides which are longer than said first sides and connected to said first sides with a right angle, said first sides of said ring-shaped vibrator having a length of about a wavelength corresponding to a frequency of said vibration, said second sides of said ring-shaped vibrator having a length slightly less than a quarter wavelength corresponding to said frequency of said vibration.

15. The vibrating gyroscope according to claim 10, wherein the vibrator is made of a piezoelectric materials the driver elements are drive electrodes and the detector elements are detector electrodes.

16. The vibrating gyroscope according to claim 15, wherein said vibrator has a planar rectangular closed-loop shape.

17. The vibrating gyroscope according to claim 16, further comprising a support means for supporting said vibrator at a selected position near the node thereof.

* * * * *